(12) United States Patent
Jones et al.

(10) Patent No.: US 9,614,209 B2
(45) Date of Patent: Apr. 4, 2017

(54) AIRCRAFT INCLUDING MITIGATION SYSTEM FOR RECHARGEABLE BATTERIES

(71) Applicant: The Boeing Company, Chicago, IL (US)

(72) Inventors: Kelly T. Jones, Snohomish, WA (US); Alfred R. Carlo, Mukilteo, WA (US); Alan D. Amort, Lake Forest Park, WA (US); Daniel F. Lewinski, Stanwood, WA (US); Daniel J. Murray, Mill Creek, WA (US); Douglas D. Maben, Snohomish, WA (US); Harry H. Ayubi, Snohomish, WA (US); Craig G. Robotham, Mill Creek, WA (US); Julie K. Plessner, Poulsbo, WA (US); Kevin S. Callahan, Shoreline, WA (US); Michael L. Trent, Everett, WA (US); Michael R. Madden, Mount Vernon, WA (US); Mohammad M. Malik, Bothell, WA (US); Richard K. Johnson, Camano Island, WA (US); Royal E. Boggs, Bothell, WA (US); Mehdy Barekatein, Kirkland, WA (US); Frederic P. Lacaux, Kirkland, WA (US); Bruce L. Drolen, Altadena, CA (US); James C. Russell, Bellevue, WA (US); John R. Lowell, Fairfax, VA (US); Thomas P. Barrera, Long Beach, CA (US); Timothy R. North, Dickinson, TX (US); Richard P. Lorenz, Woodinville, WA (US); Matthew J. O'Brien, Lake Stevens, WA (US); Nels A. Olson, Seattle, WA (US); David C. Shangraw, Tukwila, WA (US); Mark E. Smith, Renton, WA (US); Jean-Philippe Belieres, Redmond, WA (US); George A. McEachen, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 256 days.

(21) Appl. No.: 14/188,683

(22) Filed: Feb. 24, 2014

(65) Prior Publication Data
US 2014/0242424 A1   Aug. 28, 2014

Related U.S. Application Data

(60) Provisional application No. 61/769,173, filed on Feb. 25, 2013, provisional application No. 61/769,176, (Continued)

(51) Int. Cl.
*H01M 2/12* (2006.01)
*H01M 2/18* (2006.01)
(Continued)

(52) U.S. Cl.
CPC ....... *H01M 2/1241* (2013.01); *H01M 2/1077* (2013.01); *H01M 2/12* (2013.01);
(Continued)

(58) Field of Classification Search
CPC .................................................. H01M 2/1252
See application file for complete search history.

(56) References Cited

U.S. PATENT DOCUMENTS

4,468,440 A * 8/1984 Evjen ............ H01M 10/63
   429/120
4,486,440 A * 12/1984 Emanuel ............ A61K 31/44
   514/345

(Continued)

FOREIGN PATENT DOCUMENTS

| WO | 2004064082 A2 | 7/2004 |
| WO | 2012147331 A1 | 11/2012 |

*Primary Examiner* — Scott J Chmielecki (74) *Attorney, Agent, or Firm* — Miller, Matthias & Hull LLP (57) ABSTRACT

An aircraft comprises a rechargeable battery including an array of battery cells, and means for mitigating consequences of failure of the rechargeable battery due to aircraft operating cycles.

24 Claims, 5 Drawing Sheets

Related U.S. Application Data filed on Feb. 25, 2013, provisional application No. 61/769,187, filed on Feb. 25, 2013, provisional application No. 61/769,110, filed on Feb. 25, 2013, provisional application No. 61/769,328, filed on Feb. 26, 2013, provisional application No. 61/769,338, filed on Feb. 26, 2013, provisional application No. 61/769,348, filed on Feb. 26, 2013.

(51) Int. Cl.

| | | |
|---|---|---|
| *H01M 10/48* | (2006.01) | |
| *H01M 2/10* | (2006.01) | |
| *H01M 2/34* | (2006.01) | |
| *H01M 10/625* | (2014.01) | |
| *H01M 10/658* | (2014.01) | |
| *H01M 10/0525* | (2010.01) | |
| *H01M 10/647* | (2014.01) | |

(52) U.S. Cl.
CPC ........... *H01M 2/1229* (2013.01); *H01M 2/18* (2013.01); *H01M 2/34* (2013.01); *H01M 10/48* (2013.01); *H01M 10/482* (2013.01); *H01M 10/625* (2015.04); *H01M 10/658* (2015.04); *H01M 2/1252* (2013.01); *H01M 10/0525* (2013.01); *H01M 10/486* (2013.01); *H01M 10/647* (2015.04); *H01M 2200/00* (2013.01); *H01M 2220/20* (2013.01)

(56) References Cited

U.S. PATENT DOCUMENTS

| | | | |
|---|---|---|---|
| 4,762,978 A | | 8/1988 | Tanis |
| 5,609,972 A | * | 3/1997 | Kaschmitter ....... H01M 2/1241 429/56 |
| 6,007,944 A | * | 12/1999 | Bechtold ............... H01M 2/021 429/211 |
| 2010/0136404 A1 | | 6/2010 | Hermann et al. |
| 2010/0136409 A1 | * | 6/2010 | Straubel ............... H01M 2/0267 429/129 |
| 2010/0293959 A1 | * | 11/2010 | Remy ...................... F02C 3/30 60/773 |
| 2011/0159340 A1 | | 6/2011 | Hu |
| 2011/0178648 A1 | * | 7/2011 | Calvignac ............... F01D 15/10 700/291 |
| 2012/0074617 A1 | | 3/2012 | Eckel et al. |
| 2013/0032219 A1 | * | 2/2013 | Heim ................... H01M 2/1241 137/14 |
| 2013/0149582 A1 | * | 6/2013 | Kimura ................. H01M 10/50 429/120 |
| 2015/0340673 A1 | * | 11/2015 | Joswig ................ H01M 2/1072 429/56 |

* cited by examiner

AIRCRAFT INCLUDING MITIGATION SYSTEM FOR RECHARGEABLE BATTERIES

This application claims the benefit of the following provisional applications: U.S. Ser. No. 61/769,173, filed 25 Feb. 2013; U.S. Ser. No. 61/769,176 filed 25 Feb. 2013; U.S. Ser. No. 61/769,187 filed 25 Feb. 2013; U.S. Ser. No. 61/769,110 filed 25 Feb. 2013; U.S. Ser. No. 61/769,328 filed 26 Feb. 2013; U.S. Ser. No. 61/769,338 filed 26 Feb. 2013; and U.S. Ser. No. 61/769,348 filed 26 Feb. 2013; each of which is incorporated herein by reference.

BACKGROUND

Commercial aircraft have typically used bleed air from their turbine propulsion engines to provide motive power for subsystems such as environmental controls and brakes. However, this use of bleed air reduces efficiency of the turbine engines. Moreover, ducts, valves and controls for supplying the bleed air to the subsystems add weight to the aircraft.

More advanced commercial airliners may use electricity to power certain subsystems that, in the past, were powered by bleed air. The electrical power is supplied from generators driven by the propulsion engines. Backup electrical power is available from generators driven by an on-board auxiliary power unit (APU). Additional backup electrical power is available from a ram air turbine.

Rechargeable batteries provide yet another source of backup electrical power. However, nickel-cadmium (Ni—Cd) batteries, which were used on earlier commercial aircraft, aren't feasible for providing the backup power to certain subsystems.

Lithium-ion (Li-ion) batteries (LIBs) are the rechargeable batteries of choice. Lithium-ion batteries such as lithium cobalt oxide batteries have lower weight and higher energy density than Ni—Cd batteries. They have no memory degradation.

Certain lithium-ion batteries have longstanding issues with thermal runaway. As used herein, thermal runaway means a situation where an increase in temperature causes a further increase in temperature that may lead to decreased efficiency. For example, heat generated from an exothermic chemical reaction may increase the rate of the chemical reaction. Designers of complex systems may address such inefficiencies in various ways.

SUMMARY

According to an embodiment herein, an aircraft comprises a rechargeable battery including an array of battery cells, and means for mitigating consequences of failure of the rechargeable battery due to aircraft operating cycles.

These features and functions may be achieved independently in various embodiments or may be combined in other embodiments. Further details of the embodiments can be seen with reference to the following description and drawings.

DETAILED DESCRIPTION

Figure 1:
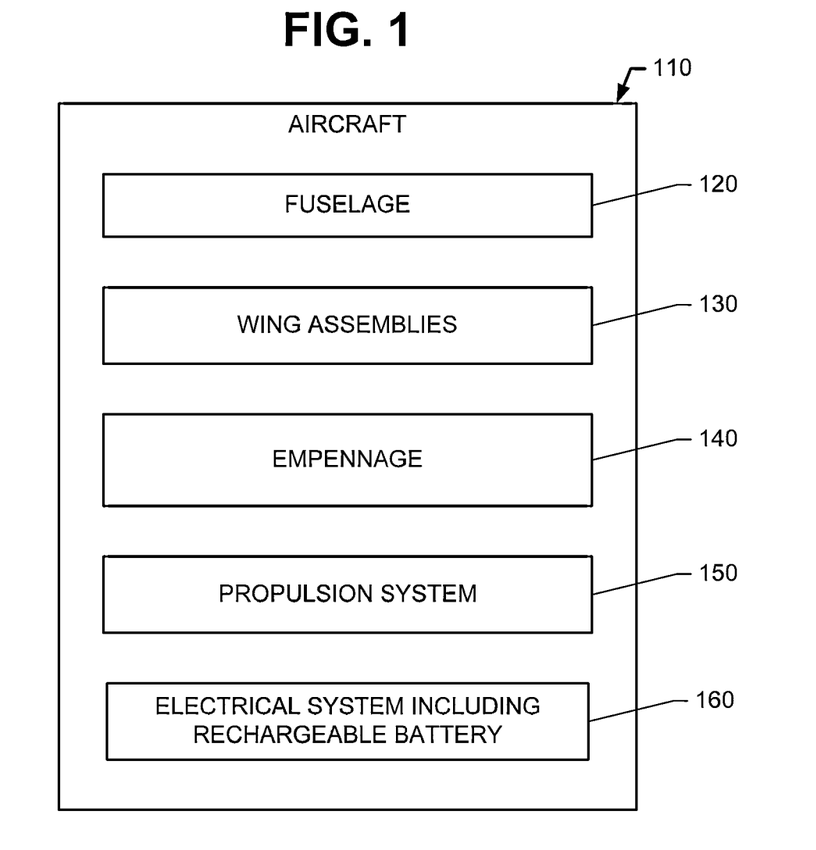
FIG. 1 is an illustration of an aircraft including an electrical system.

Reference is made to FIG. 1, which illustrates an aircraft 110. The aircraft 110 includes a fuselage 120, wing assemblies 130, empennage 140, and propulsion units 150. The aircraft 110 further includes an electrical system 160. The electrical system 160 includes electrical generators driven by the propulsion units 150. The electrical system 160 also includes at least one generator driven by an auxiliary power unit (APU). Electrical power generated by the generators is placed on electrical distribution buses. The electrical system 160 may also have provisions for receiving ground power.

The electrical system 160 further includes at least one rechargeable battery. The battery may provide backup power to one or more subsystems of the aircraft 110.

Figure 2:
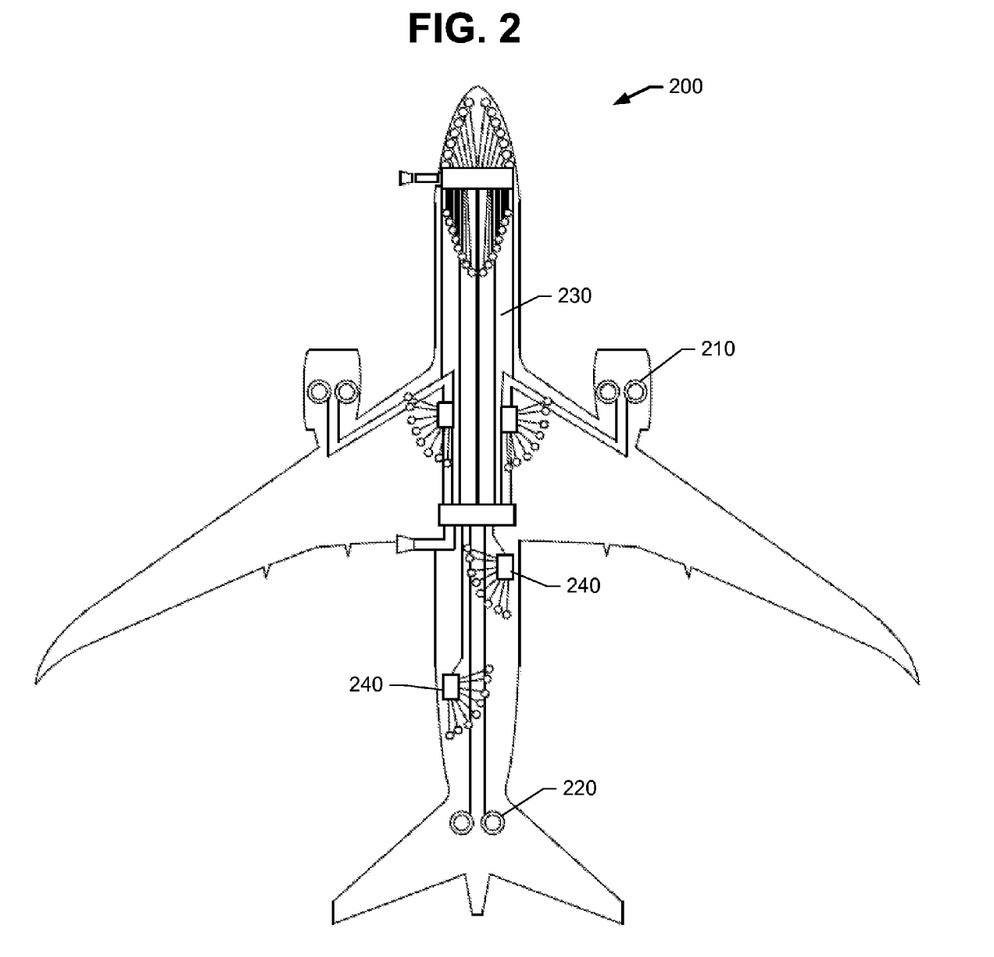
FIG. 2 is an illustration of an example of an electrical distribution system including rechargeable batteries.

Reference is now made to FIG. 2, which illustrates an example of an electrical system for an aircraft 200. The electrical system includes two starter generators 210 per engine, and two APU starter generators 220. The electrical system further includes electrical distribution buses 230, and remote power distribution units 240. A main battery is stored in a forward portion of the fuselage, and an APU battery is stored in an aft portion of the fuselage.

The main battery is used to start the aircraft 200 when the aircraft 200 is cold. For example, the main battery provides power to the aircraft's avionics. The main battery may be used to support ground operations such as refueling and powers the brakes when the airplane is towed.

The APU battery is used to start the APU. The APU starter generators 220 draw power from the APU battery (or from ground power) to start the APU, which is then used to start the starter generators 210, which in turn start the engines.

The batteries provide a source of backup power during flight and landing. If needed, they provide backup power to operate certain subsystems of the aircraft.

The batteries are subject to harsh operating conditions during an operating cycle of the aircraft 200. Consider an aircraft 200 that operates between sea level and 40,000 feet. During a single flight within a relatively short period of time, the batteries will experience large swings in temperature and pressure. They may also be subject to extreme humidity.

Figure 3:
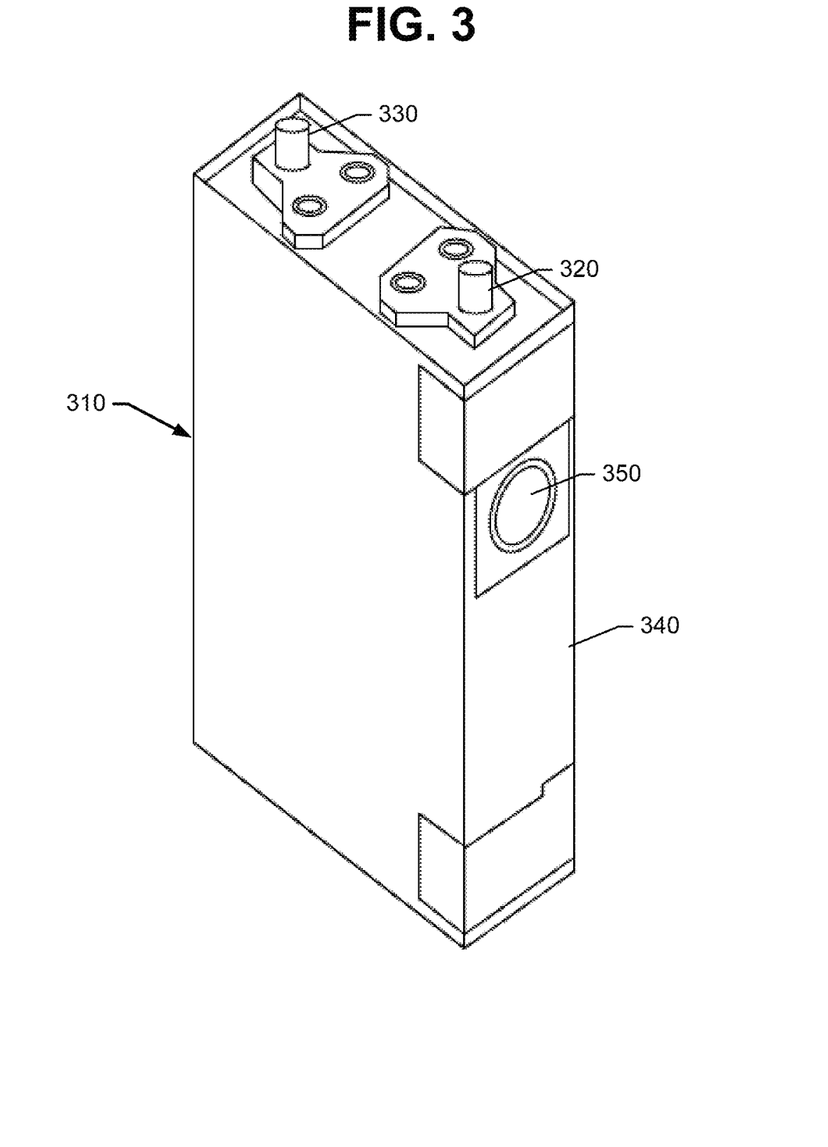
FIG. 3 is an illustration of a rechargeable battery cell.

Reference is made to FIG. 3, which illustrates an example of a rechargeable battery cell 310. The battery cell 310 includes positive and negative electrodes 320 and 330, a case 340 for the electrodes 320 and 330, and electrolyte (not shown) sealed within the case 340.

The battery cell 310 is not limited to any particular chemistry. Examples include, but are not limited to lithium-ion, metal-cadmium, and nickel metal hydride. Lithium-ion batteries offer certain advantages (e.g., lower weight, higher energy density, no memory degradation) over metal-cadmium and nickel metal hydride batteries. The rechargeable battery may be susceptible to thermal runaway. For example, the battery cell 310 may be a lithium cobalt oxide battery cell 310.

The battery cell 310 has a vent hole (not shown) at the side of its case 340, and a rupture plate 350 covering the vent hole. The rupture plate 350 may be a stainless steel membrane that is resistance welded to the case 340. The rupture plate 350 is designed to open at a predetermined internal cell pressure (which may be caused by thermal runaway) and uncover the vent hole. Once the vent hole has been uncovered, materials from inside the case 340 may be expelled through the vent hole.

The battery cell 310 is not limited to any particular geometry. For example, the battery cell may 310 be prismatic or cylindrical. FIG. 3 shows a battery cell 310 that is prismatic.

Figure 4:
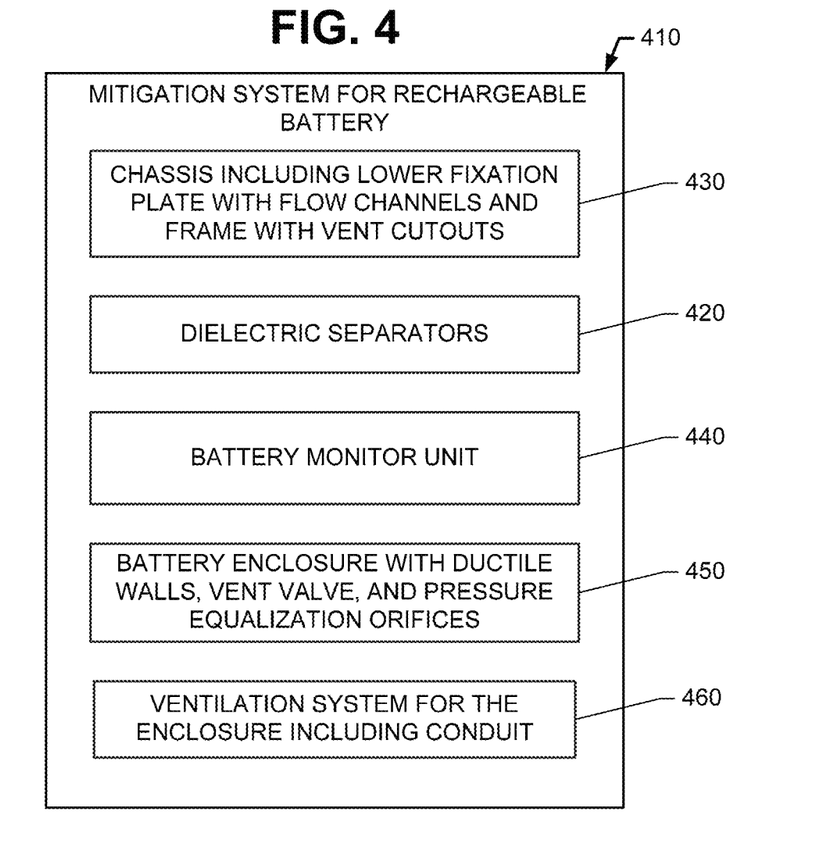
FIG. 4 is an illustration of a mitigation system for a rechargeable battery.

Reference is made to FIG. 4, which illustrates a mitigation system 410 for a rechargeable battery of an aircraft. The mitigation system 410 is configured to mitigate consequences of a battery failure due to thermal runaway. For the purpose of illustration, the mitigation system 410 will be described in connection with prismatic battery cells arranged in an array (e.g., a 4×2 array). The mitigation system 410 of FIG. 4 illustrates five mitigation features 420-460.

The first mitigation feature includes a plurality of dielectric separators 420 between the battery cells for creating thermal barriers between opposing surfaces of the battery cells. The dielectric separators 420 are made of a fiber composite. The fiber composite may include fibers in a phenolic resin matrix. For example, the fiber composite may include a glass fiber phenolic. The dielectric separators 420 may have the form of a lattice, and the battery cells may populate spaces formed by the lattice. The dielectric separators 420 are described in greater detail in U.S. Ser. No. 14/188,663, filed concurrently herewith and incorporated herein by reference.

The second mitigation feature is a battery chassis 430. The chassis 430 includes a lower fixation plate. The battery cells are supported by the lower fixation plate. The lower fixation plate includes a plurality of flow channels positioned to collect condensate from the battery cells and move the collected condensate away from the battery cells.

The flow channels may include drainage holes in a substrate of the lower fixation plate. Each drainage hole may be located beneath portions of at least two battery cells. The flow channels may further include grooves in the substrate. The grooves may extend between the drainage holes. The lower fixation plate may further include a lattice of cell dividers on the substrate. The battery cells are located between the cell dividers. The grooves extend between the drainage holes, along the cell dividers.

The chassis 430 may also include a frame having vent cutouts. The battery cells are oriented on the lower fixation plate such that their rupture plates are coincident with the vent cutouts.

The chassis 430 is described in greater detail in U.S. Ser. No. 14/188,667, filed concurrently herewith and incorporated herein by reference.

The third mitigation feature is a battery monitoring unit (BMU) 440. The BMU is configured to receive signals (e.g., temperature signal, a voltage signal, or a current signal) from the battery cells, and process the signals to determine status of the battery. The BMU 440 may be configured to removably connect the battery to a master/module interface, and deliver power from the battery to the master/module interface. The BMU 440 may be further configured to interrupt deliverance of battery power to the master/module interface. The BMU may be further configured to operate the battery in a voltage range that reduces heat and is further configured to prevent over-charging damage. The BMU 440 is described in greater detail in U.S. Ser. No. 14/018,047 filed 4 Sep. 2013 and incorporated herein by reference.

The fourth mitigation feature is a metal enclosure 450. The battery is inside the metal enclosure 450. The metal enclosure 450 may have any one of the following features:

(1) One or more containment walls made of a ductile material.
(2) A normally closed vent valve configured to open when pressure inside the enclosure corresponds to a battery failure event.
(3) At least one wall having at least one orifice configured for pressure equalization while allowing pressure caused by a battery failure event to build up within the enclosure 450. The at least one orifice may be further configured to restrict mass rate of air flow into the enclosure 450 during a battery failure event.

The enclosure 450 is described in greater detail in U.S. Ser. No. 14/188,685 filed concurrently herewith and incorporated herein by reference.

The fifth mitigation feature is a ventilation system 460 including a ventilation conduit. The ventilation conduit extends from the vent valve to an opening in composite skin of the aircraft. The conduit is made of metal except for an end portion at the skin. The end portion functions as an electrical insulator. The end portion of the conduit may include a tube made of an electrically non-conductive material. The tube may have a length of at least two inches. If the end portion includes a flange fitting having a portion that extends into the opening in the composite skin, a thermal spacer may be located between the flange fitting and the composite skin. The ventilation system 460 is described in greater detail in U.S. Ser. No. 14/188,603 filed 24 Feb. 2014 and incorporated herein by reference.

The mitigation system 410 may include at least one of these five features 420-460 for mitigating consequences of a battery failure. Some embodiments of the mitigation system 410 include only a single one of these features 420-460. Some embodiments of the mitigation system 410 may include combinations of certain ones of these features 420-460. Still other embodiments of the mitigation system 410 include all of these features 420-460.

For instance, the first three mitigation features 420-440 may be built into a rechargeable battery of an aircraft. The battery includes a battery chassis 430 having vent cutouts and a lower fixation plate having flow channels. A lattice of dielectric separators 420 is placed on the lower fixation plate of the chassis 430, and battery cells are placed in spaces between the dielectric separators 420. The vent holes of the battery cells are coincident with the vent cutouts in the chassis 430. The battery monitoring unit 440 is added, and the chassis 430 is enclosed.

In some embodiments, a battery having these features 420-440 may be placed in a compartment. In other embodiments, this battery may be placed in the enclosure 450, which utilizes the ventilation system 460.

Figure 5:
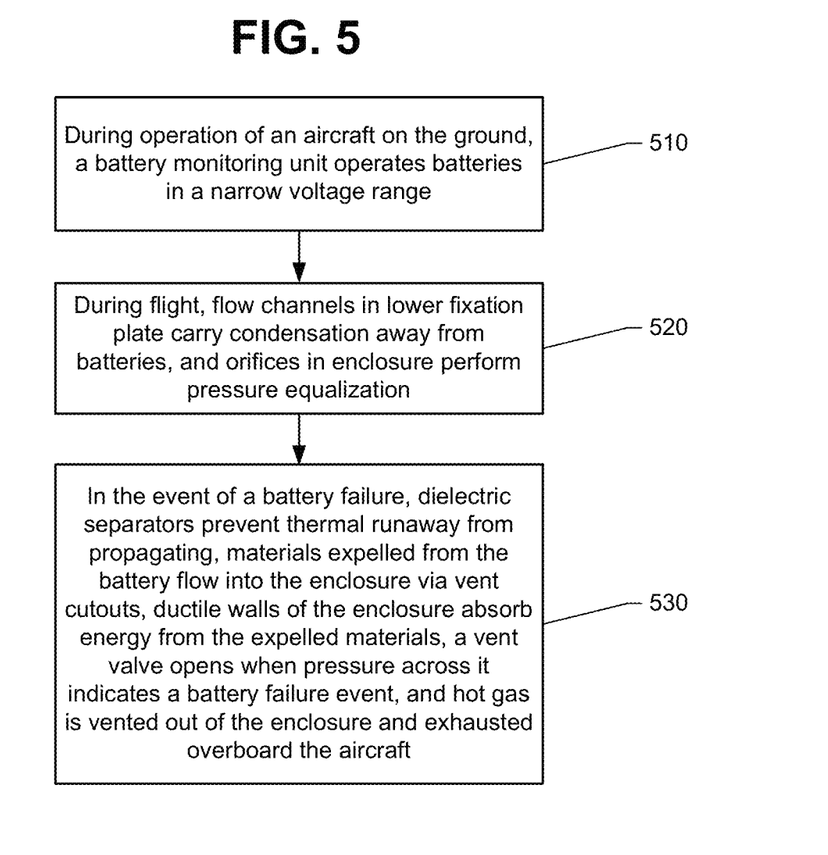
FIG. 5 is an illustration of a method of mitigating consequences of a battery failure during an operating cycle of an aircraft.

Reference is now made to FIG. 5, which illustrates a method of mitigating consequences of a failure of a rechargeable battery in an aircraft during an aircraft operating cycle. During this operating cycle, the aircraft climbs about 25,000 feet to 40,000 feet between take-off and cruise, traverses regions of varying humidity, pressure, and temperature, and then descends about 25,000 to 40,000 feet to its destination. The method is described for a mitigation system 410 having all five features 420-460.

Block 510 corresponds to functions that reduce battery stress prior to takeoff. When battery power is used on the ground, the BMU 440 operates the battery in a narrow voltage range to reduce heat. The BMU 440 also prevents over-charging damage.

Block 520 corresponds to functions that are performed to reduce the chance of battery failure during flight. Any condensate forming on the battery cells is drained from the chassis 430 by the flow channels.

Pressure equalization in the enclosure 450 is performed to reduce stress on the enclosure components. Stress is also reduced on the battery inside the enclosure 450.

Block 530 corresponds to a battery failure event. If a battery cell experiences thermal runaway, for instance, the dielectric separators 420 prevent thermal runaway from propagating from the failed cell to neighboring battery cells.

Materials are expelled from the failed cell, through the vent cutouts in the chassis 430 and into the enclosure 450. The ductile walls of the enclosure 450 absorb energy from material expelled into the enclosure 450.

Moreover, the vent valve is exposed to a rise in pressure in the enclosure. When the pressure in the enclosure 450 is indicative of a battery failure event, the vent valve opens. Hot gas is vented out the enclosure 450 and exhausted overboard the aircraft by the ventilation system 460. While the vent valve is opened, the pressure equalization orifices restrict the mass flow of air into the enclosure.

The invention claimed is:

1. An aircraft comprising:
   a fuselage defining an interior environment inside the fuselage and an exterior environment outside of the fuselage;
   a rechargeable battery disposed in the fuselage and including an array of battery cells;
   a metal enclosure surrounding the battery and defining a cavity sized to receive the battery, the metal enclosure including:
   at least one containment wall formed of a ductile material; a wall opening formed in the at least one containment wall;
   a ventilation conduit extending from the wall opening to an opening in composite skin of the fuselage, thereby to establish fluid communication between the cavity and the exterior environment, the ventilation conduit made of metal except for an end portion at the skin, the end portion functioning as an electrical insulator;
   a normally closed vent valve disposed in the wall opening and configured to open when a pressure inside the enclosure corresponds to a battery failure event; and
   at least one continuously open orifice formed in the at least one containment wall, fluidly communicating between the cavity and the interior environment of the fuselage.

2. The aircraft of claim 1, in which the at least one continuously open orifice is configured to permit pressure equalization between the cavity and the interior environment of the fuselage over a pressure equalization duration that is greater than a predetermined activation time of the vent valve, and to restrict mass rate of air flow into the enclosure during a battery failure event.

3. The aircraft of claim 1, in which the at least one continuously open orifice is configured to permit pressure equalization between the cavity and the interior environment of the fuselage over a pressure equalization duration that is greater than a predetermined activation time of the vent valve.

4. The aircraft of claim 3, in which the at least one continuously open orifice is further configured to restrict mass rate of air flow into the enclosure during a battery failure event.

5. The aircraft of claim 1, in which the end portion of the ventilation conduit includes a tube made of an electrically non-conductive material, the tube having a length of at least two inches.

6. The aircraft of claim 5, in which the end portion of the ventilation conduit further includes a flange fitting at an end of the tube, the flange fitting having a portion that extends into the opening of the composite skin of the fuselage, the aircraft further comprising a thermal spacer located between the flange fitting and the composite skin.

7. The aircraft of claim 1, further comprising a plurality of dielectric separators between the battery cells for creating thermal barriers between opposing surfaces of the battery cells, the dielectric separators made of a fiber composite.

8. The aircraft of claim 7, wherein the fiber composite includes fibers in a phenolic resin matrix.

9. The aircraft of claim 7, wherein the fiber composite includes a glass fiber phenolic.

10. The aircraft of claim 7, wherein the battery cells are prismatic, wherein the dielectric separators form a lattice, and wherein the battery cells populate spaces formed by the lattice.

11. The aircraft of claim 1, further comprising a chassis including a lower fixation plate, the battery cells on the lower fixation plate, the lower fixation plate including a plurality of flow channels positioned to collect condensate from the battery cells and direct the collected condensate away from the battery cells.

12. The aircraft of claim 11, in which the lower fixation plate further includes a substrate; and wherein the flow channels include drainage holes in the substrate, each drainage hole located beneath portions of at least two battery cells.

13. The aircraft of claim 12, wherein the flow channels further include grooves in the substrate, the grooves extending between the drainage holes.

14. The aircraft of claim 13, wherein the lower fixation plate further includes a lattice of cell dividers on the substrate, the battery cells located between the cell dividers, the grooves extending between the drainage holes, along the cell dividers.

15. The aircraft of claim 1, in which a side of each battery cell includes a rupture plate, the aircraft further including a chassis including a frame having vent cutouts, wherein the battery cells are oriented such that their rupture plates are coincident with the vent cutouts.

16. The aircraft of claim 1, further including a battery monitoring unit (BMU) configured to receive signals from the battery cells, and process the signals to determine status of the battery cells; wherein the signals include at least one of a temperature signal, a voltage signal, or a current signal.

17. The aircraft of claim 16, in which the BMU is configured to removably connect the battery to a master/module interface; and deliver power from the battery to the master/module interface.

18. The aircraft of claim 17, in which the BMU is further configured to interrupt delivery of battery power to the master/module interface.

19. The aircraft of claim 18, in which the BMU is configured to operate the battery in a voltage range that reduces heat and is further configured to prevent overcharging damage.

20. The aircraft of claim 1, wherein the rechargeable battery is a lithium cobalt oxide battery.

21. The aircraft of claim 1, wherein the battery is a main battery.

22. The aircraft of claim 1, wherein the battery is an auxiliary power unit (APU) battery.

23. The aircraft of claim 1, further comprising:
- a plurality of dielectric separators between the battery cells for creating thermal barriers between opposing surfaces of the battery cells, the dielectric separators made of a fiber composite; and
- a chassis including:
    - a lower fixation plate, the battery cells disposed on the lower fixation plate, the lower fixation plate including a plurality of flow channels positioned to collect condensate from the battery cells and direct the collected condensate away from the battery cells; and
    - vent holes coincident with rupture plates of the battery cells.

24. The aircraft of claim 23, in which the chassis containing the battery cells is located within the enclosure.

* * * * *